United States Patent [19]

Gutierrez et al.

[11] 4,261,935
[45] Apr. 14, 1981

[54] FABRICATION OF THORIUM BEARING CARBIDE FUELS

[75] Inventors: Rueben L. Gutierrez; Richard J. Herbst; Karl W. R. Johnson, all of Los Alamos, N. Mex.

[73] Assignee: The United States of America as represented by the United States Department of Energy, Washington, D.C.

[21] Appl. No.: 96,261

[22] Filed: Nov. 20, 1979

[51] Int. Cl.³ ............................................. G21C 21/00
[52] U.S. Cl. ........................................ 264/0.5; 176/89
[58] Field of Search ............................ 176/90; 264/0.5

[56] References Cited

U.S. PATENT DOCUMENTS

| 3,347,749 | 10/1967 | Jordan | 176/69 |
| 3,813,344 | 5/1974 | Krauth et al. | 264/0.5 X |
| 3,953,556 | 4/1976 | Wilhelm et al. | 264/0.5 |

Primary Examiner—Leland A. Sebastian
Attorney, Agent, or Firm—Paul D. Gaetjens; Richard G. Besha; James E. Denny

[57] ABSTRACT

Thorium-uranium carbide and thorium-plutonium carbide fuel pellets have been fabricated by the carbothermic reduction process. Temperatures of 1750° C. and 2000° C. were used during the reduction cycle. Sintering temperatures of 1800° C. and 2000° C. were used to prepare fuel pellet densities of 87% and >94% of theoretical, respectively. The process allows the fabrication of kilogram quantities of fuel with good reproducibility of chemicals and phase composition. Methods employing liquid techniques that form carbide microspheres or alloying-techniques which form alloys of thorium-uranium or thorium-plutonium suffer from limitation on the quantities processed of because of criticality concerns and lack of precise control of process conditions, respectively.

9 Claims, 4 Drawing Figures

FABRICATION OF THORIUM BEARING CARBIDE FUELS

BACKGROUND OF THE INVENTION

1. Field of the Invention

The present invention teaches a fabrication method for thorium-uranium carbide and thorium-plutonium carbide fuels using the carbothermic reduction process. This method allows the preparation of kilogram quantities of fuel with good reproducibility of chemical and phase composition. Other methods employ liquid techniques that form carbide microspheres or alloying techniques that form alloys of thorium-uranium or thorium-plutonium. The liquid methods cannot process large quantities due to criticality concerns, while the alloy methods lack precise control of process conditions which leads to a poorly defined product. In particular, thorium-uranium carbide (Th,U)C and thorium-plutonium carbide (Th,Pu)C have been prepared by vacuum reduction of mixtures of the metallic oxides and carbon at elevated temperatures. Sintering at 1800° C. and 2000° C. produces fuel pellet densities of 87% and >94% of theoretical, respectively, from the carbides.

Thorium-uranium carbide and thorium-plutonium carbide fuels are being considered as alternative candidates to uranium-plutonium carbide fuel for the fast breeder reactor. These fuels will minimize the use of plutonium and help serve as a deterrent to the proliferation of plutonium. One of the deterrents is the production of the $_{92}^{232}U$ isotope from $_{90}^{232}Th$ in the alternative fuel cycle. This isotope emits large amounts of gamma radiation and necessitates remote handling techniques. Another deterrent is the denaturing of the fissionable isotopes used to power the reactors. That is, $_{92}^{238}U$ is a non-spontaneous fissioning nuclide and will not sustain a chain reaction. Therefore, by mixing a certain amount of $_{92}^{238}U$ with $_{92}^{233}U$ or $_{92}^{235}U$, denaturing is achieved, and complex and/or expensive isotope separation techniques would be necessary to obtain bomb grade materials.

The invention is a result of a contract with the Department of Energy.

2. Description of the Prior Art

Carbide fuels are potentially incompatible with the cladding of the fuel elements. Due to the limitations of current fuel synthesis techniques, the fuel composition cannot be controlled sufficiently well to yield a stable single-phase product. Too much carbon present, in the form of say the dicarbide, produces a carburization (embrittlement) of the cladding, while too little results in the free metal working its way through this material. A dry method for preparing the monocarbides PuC, UC, or (U,Pu)C with a metal-to-carbon ratio close to unity is described in U.S. Pat. No. 3,347,749. This patent teaches alloying U or Pu with chromium to alter the metal/carbon phase diagram allowing UC or PuC to form without requiring precise control of conditions. U.S. Pat. No. 3,813,344 teaches the preparation of (U,Pu)C by another dry technology which works for essentially the same reasons, and is similar to the carbothermic reduction of this invention. Note that the analogous plutonium fuel will not be readily synthesizable from the instant carbothermic reduction process without substantial oxygen impurity unless one is prepared to lose a large amount of plutonium metal by vaporization. Our invention, then, teaches a new method for preparing a fuel for use in nuclear reactors. Whereas the fuel itself is neither new nor impossible to prepare in another manner, the present method is safer and more economical.

3. Statement of the Objects

An object of the invention is to minimize the use of plutonium and reduce its theft and proliferation potential by providing an alternative to uranium-plutonium carbide fuel for the fast breeder reactor.

Another object of the invention is the fabrication of alternative fuels with good reproducibility of chemical and phase composition.

Another object is to produce carbide fuels of the correct composition to avoid incompatibility with the cladding material of the fuel elements.

Another object is to produce carbide fuels in large quantities without criticality concerns during the manufacturing process as is currently a problem with liquid techniques.

Another object is to produce thorium-uranium carbide and thorium-plutonium carbide alternative fuel for the fast breeder reactor.

Another object is to produce thorium-uranium carbide and thorium-plutonium carbide by the carbothermic reduction process from a mixture of the appropriate metal oxides and pure carbon.

Other objects, advantages and novel features of the invention will become apparent to those skilled in the art upon examination of the following detailed description of a preferred embodiment of the invention and the accompanying drawings.

SUMMARY OF THE INVENTION (Th,U)C or (Th,Pu)C allows thorium to be used in a breeder cycle with $^{235}U$ or $^{239}Pu$ to produce power and additional fuel. That is, the resulting $^{233}U$, from the fertile $^{232}Th$ isotope, can be used in conventional reactors. The mixed monocarbide can be easily made by the reduction of mixtures of thorium and uranium or plutonium oxides and carbon at 1750° C. or 2000° C. using the carbothermic reduction process. The invention allows fabrication of kilogram quantities of carbide with good reproducibility of chemical and phase composition. The material produced is then comminuted and sieved through a specified mesh screen. If high-density fuel is specified, nickel powder (0.2 wt %) is added and blended into the carbide powder as a sintering aid. The mixture is then pressed into pellets using a Carver press. The low-density pellets are sintered at 1800° C. for eight hours and the high-density pellets at 2000° C. for two hours, resulting in fuel pellet densities of 87% and >94% of theoretical, respectively.

DESCRIPTION OF THE PREFERRED EMBODIMENT

Figure 1:
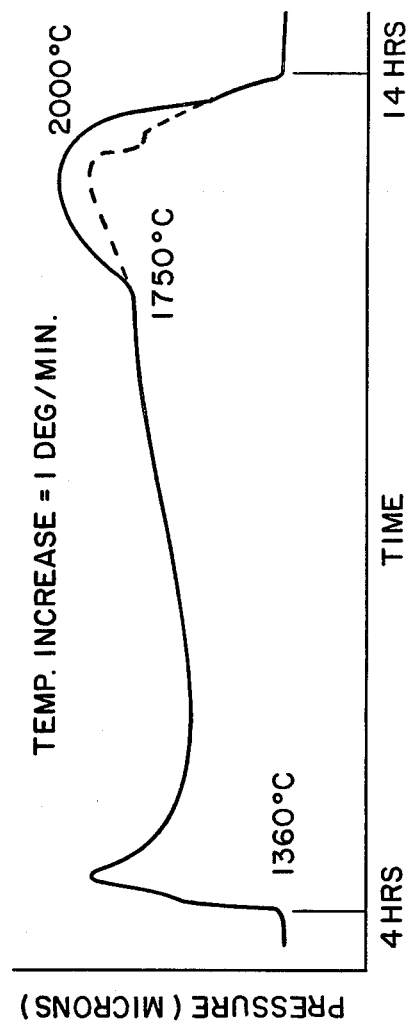
FIG. 1 shows the gas pressure of the products during the carbothermic reduction versus time.

In a preferred embodiment (Th,U)C was prepared with carbon/metal atom ratio's of 0.90 and 0.95. The metal was an 80/20 mixture of thorium/uranium. For the (Th,Pu)C fuel composition, the carbon/metal atom ratio was set at 0.95 for two different metal mixtures. The first was an 80/20 mixture of thorium/plutonium and the second a 45/55 mixture. The initial step involves the weighing, blending, and briquetting of specified oxides and carbon. The bath was divided in half, with one-half of the briquettes being vacuum reduced at 1750° C. and the remaining half of the briquettes being vacuum reduced at 2000° C. Each smaller batch was then comminuted and sieved through a specified mesh screen. If high-density fuel was specified, nickel powder (0.2 wt%) was added and blended into the carbide powder as a sintering aid. The material was then pressed into pellets using a Carver press. The low-density pellets were sintered at 1800° C. for eight hours and the high-density pellets were sintered at 2000° C. for two hours.

Table 1 lists chemical and physical data obtained from three compositions of thorium-uranium carbide and one composition of thorium carbide. The first thorium-uranium carbide composition prepared was for a carbon/metal atom ratio of 0.9. Comparing the weight percent carbon and oxygen of the briquettes from the two vacuum reduction cycles of 1750° C. and 2000° C., shows that the material from the 1750° C. reduction is an incomplete reaction. This is evident from the larger amount of carbon and oxygen in the briquettes reduced at the lower temperature. When the material from both reduction cycles is comminuted, pressed, and sintered at 2000° C., the carbon and oxygen content of the pellets from both reduction cycles are nearly equivalent. Therefore, by sintering at a temperature of 2000° C., the material incompletely reduced at 1750° C. is able to proceed to the same reaction stage as the material reduced at 2000° C. Microstructure analysis on the $(Th,U)C_{0.90}$ pellets, indicated a second phase which is believed to be oxycarbide. Previous studies showed that oxycarbide can be minimized by having a carbon/metal ratio of unity. Consequently, a batch of thorium-uranium fuel was prepared with a carbon/metal ratio of 0.95. The briquettes of the $(Th,U)C_{0.95}$ composition contained less carbon and oxygen than the briquettes of the $(Th,U)C_{0.90}$ composition when both were reduced at 1750° C.

carbon/metal ratio was 0.90. This material did not behave like the thorium-uranium carbide fuel, since although it was reduced at 1750° C. and sintered at 2000° C., it did not proceed to the same reaction stage as the material reduced at 2000° C. and sintered at 2000° C. Material from both the 1750° C. and 2000° C. reduction cycles showed an increase in oxygen content of the sintered pellet over the briquette. Oxygen is most probably acquired during the comminution step, when the material has a large surface area, although the maximum allowable operating limits for moisture and oxygen in the argon atmosphere glovebox were 10 ppm each. Another possible area of oxygen contamination could be in the sampling for chemical analyses. It is known that thorium carbides have a great affinity for oxygen and water.

For thorium-plutonium fuel, a batch of $(Th_{0.8}Pu_{0.2})C_{0.95}$ was prepared and divided in half for two carboreduction cycles. The portion that was vacuum reduced at 1750° C. had 2.5% oxygen content in the briquette and 2.3% in the sintered pellet. The remaining portion vacuum reduced at 2000° C. contained 0.54% oxygen in the briquette and 0.63% in the sintered pellet (see Table 2). Because of the high oxygen content in the material reduced at 1750° C., a second batch of $(Th_{0.8}Pu_{0.2})C_{0.95}$ was prepared using only the 2000° C. reduction cycle. A portion of the resulting pellets were sintered in flowing argon gas and the remaining pellets were sintered in a vacuum. Table 2 shows a significant reduction in the carbon and oxygen content for the pellets sintered in a vacuum over pellets sintered in flowing gas. In a second composition, two batches of $(Th_{0.45}Pu_{0.55})C_{0.95}$ were prepared. The batch reduced at 1750° C. shows the carbon and oxygen are again high and that the carbothermic reaction is incomplete. This indicates the need to vacuum reduce at a higher temperature. A reduction at 2000° C. produced briquettes which showed evidence of partial melting. There was a material weight loss of 32% by weight versus 19% by weight for a typical carbothermic reduction. This indicates that the material was close to or on a solid-liquid phase boundary. As a result of this partial melt condition, the material was not processed beyond the vacuum

TABLE I

WEIGHT PERCENT OF CARBON AND OXYGEN FOR VARIOUS (Th,U)C FUELS AND ThC INSULATOR PELLETS

| | Briquettes wt % Carbon | | Briquettes wt % Oxygen | | Pellets wt % Carbon | | Pellets wt % Oxygen | |
|---|---|---|---|---|---|---|---|---|
| | Vaccum 1750° C. | Reduction 2000° C. | Vaccum 1750° C. | Reduction 2000° C. | Sintering 2000° C. | Temperature 1800° C. | Sintering 2000° C. | Temperature 1800° C. |
| $(Th_{0.8},{}^{238}U_{0.2})C_{0.90}$ (94% TD) | 5.38 | 4.61 | 0.28 | 0.063 | $4.72^a$ $4.77^b$ | — | $0.16^a$ $0.140^b$ | — |
| $(Th_{0.8},{}^{238}U_{0.2})C_{0.95}$ (95% TD) | 4.94 | 4.69 | 0.094 | 0.025 | $4.83^a$ $4.80^b$ | — | $0.270^a$ $0.110^b$ | — |
| $(Th_{0.8},{}^{238}U_{0.2})C_{0.95}$ (87% TD) | — | — | — | — | — | 4.78 | — | 0.29 |
| $ThC_{0.9}$ (95% TD) | 6.17 | 4.43 | 1.70 | 0.34 | $6.11^a$ $4.50^b$ | — | $2.50^a$ $0.47^b$ | — |

$^a$Material vacuum-reduced at 1750° C.
$^b$Material vacuum-reduced at 2000° C.

Again both compositions show very little difference in carbon and oxygen content when vacuum reduced at 2000° C. $(Th,U)_{0.95}$ fuel of 87% theoretical density (TD) was prepared using a 2000° C. reduction but a sintering temperature of 1800° C. As might be expected due to the 1800° C. sintering temperature, the fuel contained more oxygen than the same composition sintered at 2000° C. A batch of thorium carbide was prepared using the 1750° C. and 2000° C. vacuum reduction cycles. The reduction stage. Note that the vaporization of plutonium ranges between 7.4–8.1% by weight for the $(Th_{0.8}Pu_{0.2})$ composition vacuum reduced at 2000° C. and is 2.8% by weight for the $(Th_{0.45}Pu_{0.55})$ composition vacuum reduced at 1750° C.

As each batch of material was vacuum reduced, the gas pressure of the products was recorded during the entire cycle. FIG. 1 shows that the curves for the 1750° C. and 2000° C. cycles are nearly identical except for the final three hours of vacuum reduction. It is during this three hour period that the oxycarbide decomposes and the excess oxygen comes off as carbon monoxide. The curves correlate with the chemical data in that the material vacuum reduced at 2000° C. has a lower oxygen and carbon content than the material vacuum reduced at 1750° C.

C/U atom ratio for the single-phase material narrows to unity at temperatures below 800° C. Anything greater than unity will produce some higher carbide phases and less than unity will produce some free metal.

Figure 3:
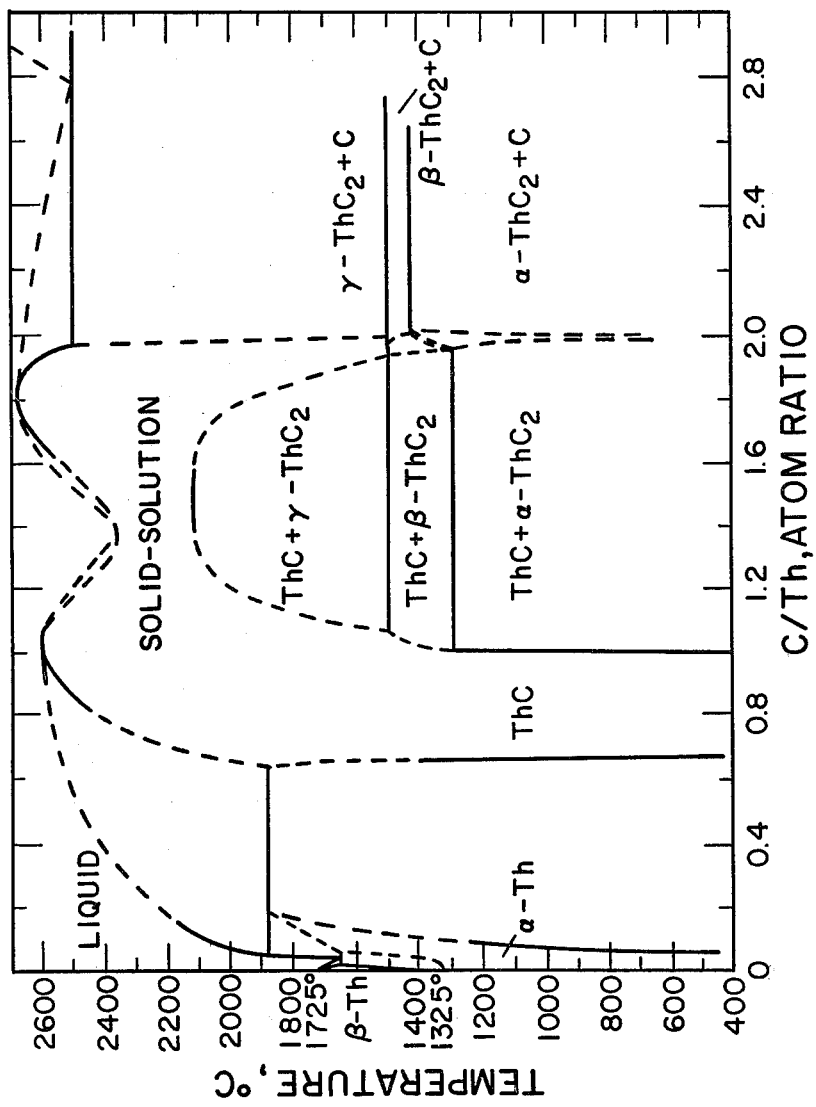
FIG. 3 shows the phase diagram for the thorium-carbon system.

The phase diagram of the thorium-carbide system (FIG. 3) shows that thorium-monocarbide exists in the C/Th atom ratio range of 0/675–1.0. With this broad compositional range and high melting point of 2600° C., the concern of obtaining the dicarbide phase or free metal is essentially eliminated, and suggests the present mixture route to obtain the monocarbide phase in the fuel elements.

TABLE 2

| Fuel Type<br>Temp. Parameters | Thorium-Plutonium Carbide | | | |
| --- | --- | --- | --- | --- |
| | $(Th_{0.8}Pu_{0.2})C_{0.95}$<br>87% T.D. | $(Th_{0.8}Pu_{0.2})C_{0.95}$<br>87% T.D. | $(Th_{0.45}Pu_{0.55})C_{0.95}$<br>93% T.D. | $(Th_{0.45}Pu_{0.55})C_{0.95}$<br>Partial Melt |
| Pellet (Ar-1800), wt % C. | 5.21 | 5.21 | 5.72 | — |
| Pellet (V-1800), wt % C. | — | 4.94 | — | — |
| Pellet (Ar-1800), wt % Ox. | 0.63 | 0.57 | 1.3 | — |
| Pellet (V-1800), wt % Ox. | — | 0.36 | — | — |
| Initial $\frac{Pu}{Th + Pu}$ | 0.2082 | 0.2080 | 0.5653 | 0.5673 |
| Final $\frac{Pu}{Th + Pu}$ | 0.1912 | 0.1927 | 0.5496 | 0.5209 |
| Plutonium loss wt % | 8.1 | 7.4 | 2.8 | 8.2 |
| Vacuum Reduction, °C. | 2000 | 2000 | 1750 | 2000 |
| C/M atom ratio | 1.0 (Ar) | 1.08 (Ar)<br>1.03 (V) | 1.21 (Ar) | — |

Ar = Sintered in flowing argon.
V = Sintered in vacuum.

Although these fuels have a lower breeding ratio and longer doubling time than the uranium-plutonium carbide fuel, when compared to their oxide analogs, the (Th,U)C and (Th,Pu)C fuels maintain an advantage in higher metal density, thermal conductivity, and breeding ratio properties. Further, because of the higher melting temperature component of the (Th,U)C fuel versus (U,Pu)C fuel, the thorium based fuel system operates at higher temperatures and offsets the lower thermal conductivity of the thorium based system.

The foregoing description of a preferred embodiment of the invention has been presented for purposes of illustration and description and is not intended to be exhaustive or to limit the invention to the precise form disclosed. It was chosen and best described in order to best explain the principles of the invention and their practical application to thereby enable others skilled in the art to best utilize the invention in various embodiments and with various modifications as are suited to the particular use contemplated. It is intended that the scope of the invention be defined by the claims appended hereto.

CONCEPT OF THE INVENTION

Because of proven process parameters, fabrication of thorium-uranium and thorium-plutonium carbide fuels should closely parallel the fabrication of (U,Pu)C fuel. In the (U,Pu)C system, carburization of the cladding seems to be exacerbated, for sodium-bonded fuel elements, by additional carbon in the fuel when the carbon/metal atom ratio is greater than unity. On the other hand, if fuel is prepared having a carbon/metal atom ratio much less than unity, the chance of producing free metal during burn-up is high. The metal will settle in the grain boundaries of the fuel and increases the rate of fuel swelling. On this basis, it is reasonable to prepare (Th,U)C and (Th,Pu)C fuels having carbon/metal atom ratios which are equal to or slightly less than unity. The phase diagrams of uranium-carbon thorium-carbon, and plutonium-carbon support this approach.

Figure 2:
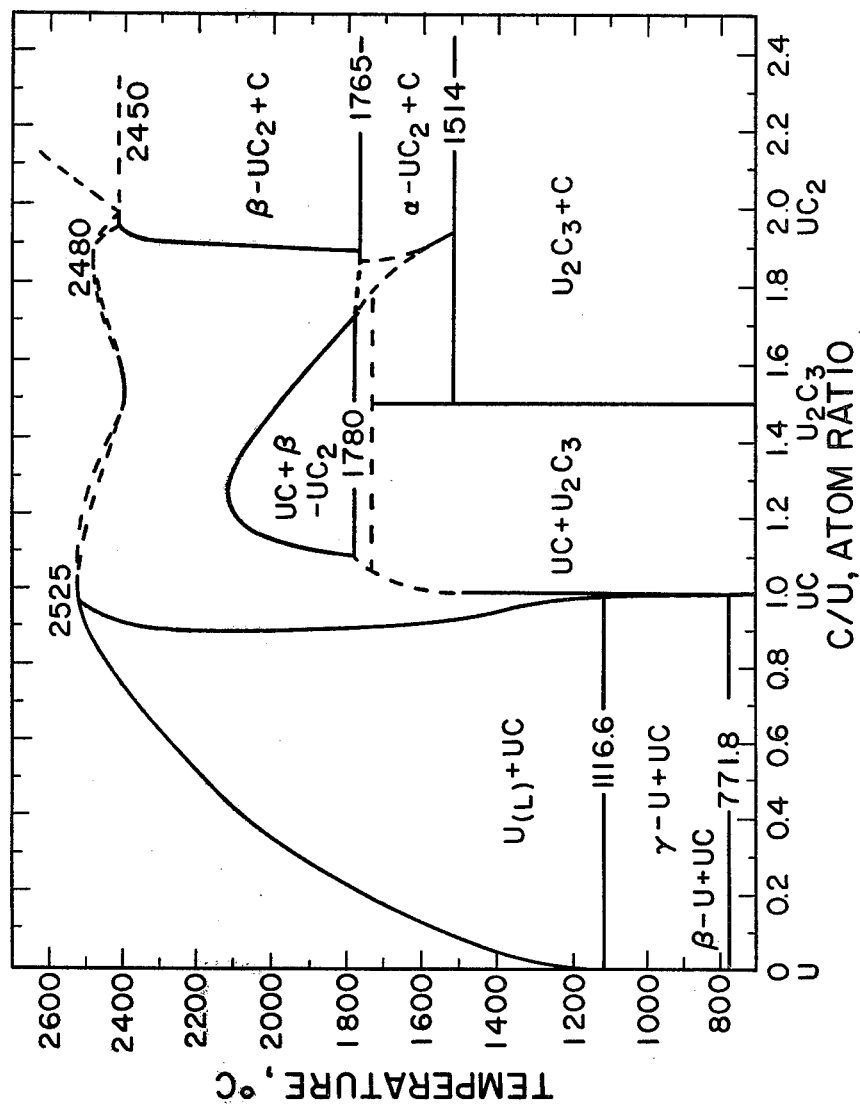
FIG. 2 shows the phase diagram for the uranium-carbon system.

The uranium-carbon system (FIG. 2) clearly shows the difficulty in obtaining uranium-monocarbide. The During the preparation of the thorium-uranium carbide and thorium-plutonium carbide fuels it was found that reaction temperatures greater than 1750° C. must be used so that the oxygen content of the fuel is kept at a minimum. It is likely that part of the oxygen is in the form of an oxycarbide phase from examination of the chemical data and performing microstructure analyses. It was also observed that vacuum sintering reduced the carbon and oxygen content in the fuel as compared to identical material sintered in flowing gas.

Figure 4:
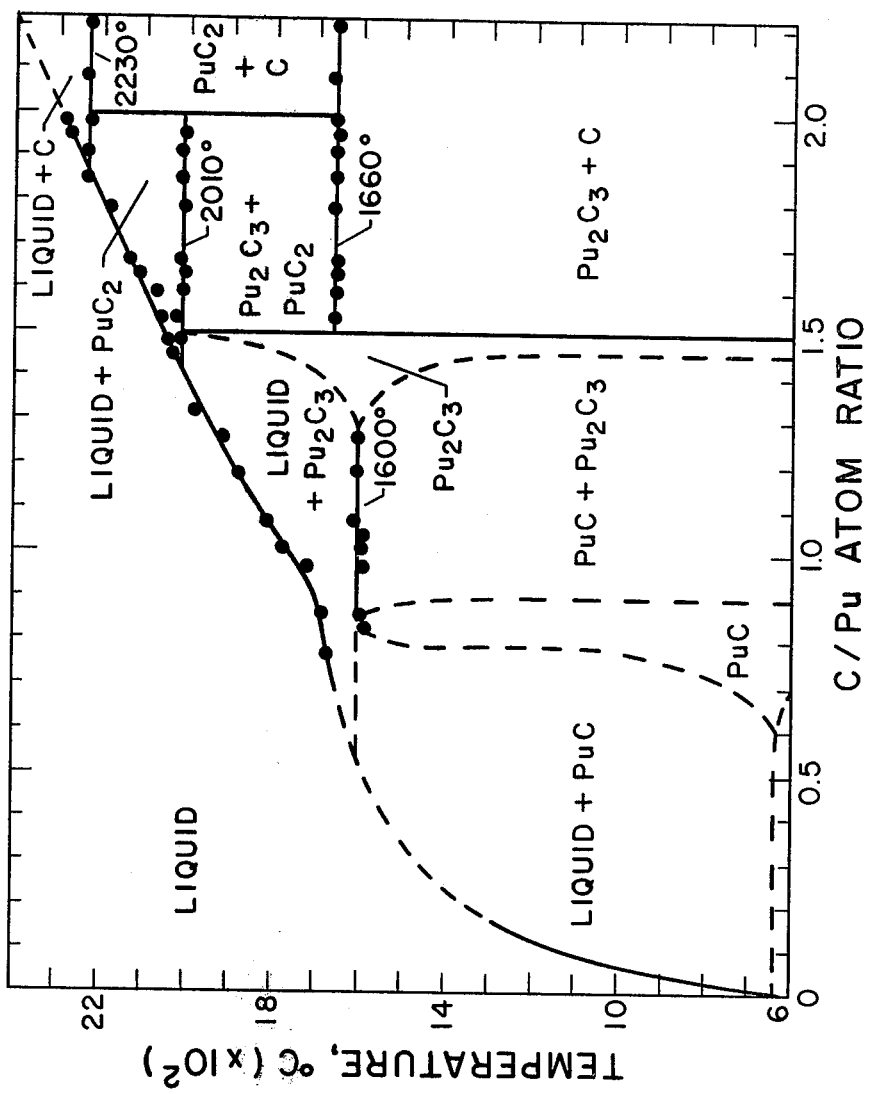
FIG. 4 shows the phase diagram for the plutonium-carbon system.

In the plutonium-carbon system (FIG. 4), the C/Pu atom ratio range for plutonium-monocarbide is 0.8–0.9. This range is not as broad as for thorium-monocarbide and the melting point for the solid-solution plutonium-monocarbide material occurs at the lower temperature of 1600° C. Preparation of thorium-plutonium carbides, then, results in the vaporization of a large quantity of plutonium when vacuum reduction and sintering at temperatures above 1750° C. are attempted in order to decrease the oxygen content of fuel. This does not occur with uranium-plutonium carbides however, where a vacuum reduction temperature of 1550° C. is used to prepare fuel in which the plutonium vaporization is lower by a factor of about 5 and the oxygen concentration lower than 300 ppm. It is doubtful, therefore, that low oxygen content $(Th_{0.45}Pu_{0.55})C_{0.95}$ fuel can be prepared using the carbothermic reduction process, without significant plutonium metal loss from the sample.

What is claimed is:

1. A process for producing thorium-uranium carbide and thorium-plutonium carbide fuel pellets by carbothermic reduction comprising:

(a) weighing, blending and briquetting certain specified oxides of thorium, uranium and plutonium, and pure carbon, (b) vacuum reduction of the briquettes at elevated temperatures, (c) comminuting and sieving the reduced product, (d) pressing the carbide powder into pellets, and (e) sintering the pellets at elevated temperatures.

2. The process of claim 1 wherein said thorium-uranium carbide is prepared with carbon/metal atom ratios of 0.90 and 0.95, the metal being a mixture of 80/20 thorium/uranium.

3. The process of claim 2 wherein said briquettes are vacuum reduced at 1750° C. or 2000° C.

4. The process of claim 3 wherein said metal carbide is blended with 0.2 wt. % nickel powder pressed into pellets and sintered at 2000° C. for two hours if high density fuel is specified.

5. The process of claim 3 wherein said metal carbide is pressed into pellets and sintered at 1800° C. for eight hours if low-density fuel is specified.

6. The process of claim 1 wherein said thorium-plutonium carbide is prepared with a carbon/metal atom ratio of 0.95, the metal being a mixture of either 80/20 or 45/55 thorium/plutonium.

7. The process of claim 6 wherein said briquettes are vacuum reduced at 1750° C. or 2000° C.

8. The process of claim 7 wherein said metal carbide is blended with 0.2 wt. % nickel power pressed into pellets and sintered at 2000° C. for two hours if high density fuel is specified.

9. The process of claim 7 wherein said metal carbide is pressed into pellets and sintered at 1800° C. for eight hours if low-density fuel is specified.

* * * * *